Dec. 3, 1968  S. B. APPLEBAUM ET AL  3,414,508
CONDENSATE PURIFICATION PROCESS
Filed March 21, 1967  2 Sheets-Sheet 1

INVENTORS
SAMUEL B. APPLEBAUM
and GEORGE J. CRITS
BY
ATTORNEYS

United States Patent Office 3,414,508
Patented Dec. 3, 1968

3,414,508
CONDENSATE PURIFICATION PROCESS
Samuel B. Applebaum, Philadelphia, and George J. Crits, Havertown, Pa., assignors to Crane Co., Chicago, Ill., a corporation of Illinois
Continuation-in-part of application Ser. No. 411,241, Nov. 16, 1964. This application Mar. 21, 1967, Ser. No. 624,947
6 Claims. (Cl. 210—32)

ABSTRACT OF THE DISCLOSURE

A condensate purification process involves demineralization in a mixed bed exchanger, including anion exchange resin granules of relatively lower density and at least ultimately ammoniated cation exchange resin granules of relatively higher density under conditions minimizing alkali metal leakage. The result is attained by preventing access of alkali regenerant to the cation exchange resin. The resins are separated into layers and regeneration is accomplished either in the same vessel or in different vessels.

CROSS-REFERENCE TO RELATED APPLICATION

This application is in part a continuation of application Ser. No. 411,241, filed Nov. 16, 1964, now abandoned.

FIELD OF THE INVENTION

This invention relates to a condensate purification process involving ion exchange with the maintenance of an ammonia content in a recirculatory system particularly adapted for the handling of high flow rates of the condensate. The invention is particularly applicable to steam turbine power plants.

DESCRIPTION OF THE PRIOR ART

In a steam turbine power plant system it is of great importance to provide water for steam generation which is substantially completely free of solid content which, if present, would produce coating of surfaces within the turbine and boiler and elsewhere. Even though condensate is recirculated in the system to supply a boiler, there is always accumulation of solid solutes due to the necessity for providing makeup water, possible leakage into a condenser, and solution of metal. To minimize the latter, copper alloys for the tubing in the condenser and feedwater heaters have been replaced by iron. When iron is used it is permissible to raise the pH of the water to minimize metal corrosion. Ammonia has been introduced for the purpose of raising the pH, and while a pH of 9.0 involves the presence of ammonia in amounts of the order of 300 parts per billion, raising of the pH to approximately 10.0, as is most desirable, requires ammonia to be present in an amount of the order of 3000 parts per billion. A pH of less than 9.0 was involved when copper alloys were used and this presented no special problem.

In order to remove the undesirable ions from the recirculated condensate mixed bed demineralizers have been used operating with a high rate of flow. When pH values of less than 9 have been involved it was practical to use in the demineralizers hydrogen cation exchange resin and hydroxide anion exchange resin. But when the pH is substantially higher (9.6 to 10.0 for example) the additional ammonia required in the system produced rapid exhaustion of the cation exchange resin requiring frequent regeneration, there being also involved removal of ammonia from the recirculatory system. It has been found advantageous to use an ammoniated cation resin not only to maintain the proper ammonia content (and therefore pH) of the condensate, but also to provide for long runs between regenerations.

A further problem arises, however, in that when an ammoniated cation resin is used, it has much reduced capability if preventing sodium leakage. It can handle the sodium which is of low amount such as introduced by the entry of saline water through the condenser leakage, or introduced with normal supplies of makeup water; but caustic soda is the proper regenerant for the anion exchange resin and in this regeneration sodium is introduced into a portion of the bed in quantities such as to cause displacement or leakage of this undesirable sodium during on-stream operation. If sodium form of the cation resin is inadvertently made by the caustic soda regenerant at or near the resin interface, and this is mixed with the ammoniated cation resin in the mixing step following regeneration, sodium resin will be distributed throughout, including the region near the bottom of, the bed. Subsequently, during on-stream operation, ammonium ions in the condensate will displace the undesirable sodium ions in quantities detrimental to the turbine or the other elements of the heating system. (The reason for this is that the equilibrium constant or the affinity of the cation resin for ammonium or sodium ions is about the same; meaning that the sodium will be displaced from the resin by the predominantly greater quantity of ammonia in the condensate being treated).

It is important, therefore, to carry out the regeneration under conditions precluding the introduction of any appreciable amount of sodium into the cation exchange resin or the mixed bed.

SUMMARY OF THE INVENTION

The desired operation may be achieved in two fashions. In one, this is accomplished by locating an effluent connection for regenerants and rinse water substantially above the interface between the resins at the time of regeneration, i.e. well above the interface in the anion exchange resin which overlies the cation exchange resin when the two beds are separated during regeneration.

In another form of the invention, the mixed resins from the demineralizer are delivered to a separator in which the anion and cation exchange resins are separated into layers. The anion exchange resin is then removed into a separate region in which regeneration is effected by caustic soda. The cation exchange resin is regenerated in the separator by an acid regenerant. The regeneration of anion exchange resin in a separate vessel makes possible effective rinsing to remove free alkali. The two resins are then delivered into a resin storage vessel, with admixture, and are then returned to one or more demineralizers.

DESCRIPTION OF THE PREFERRED EMBODIMENTS

Figure 1:
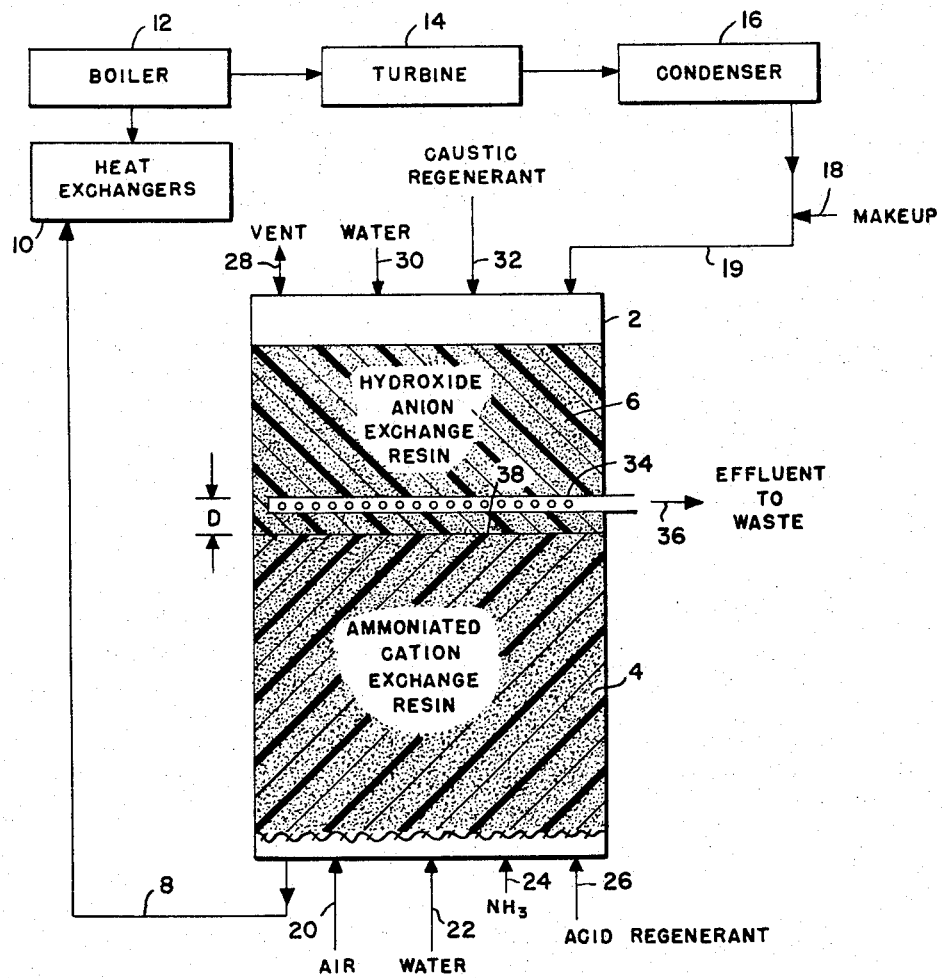
FIGURE 1 is a flow diagram illustrating one system provided in accordance with the invention.

Reference will first be made to FIGURE 1.

The ion exchange resin tank 2 may be of any conventional form and is accordingly only diagrammatically indicated. The usual single inflow and outflow distributors would be connected to piping provided with valves for routing the various flows, but for simplicity the diagram indicates by arrows the alternative flows as if they were provided through separate distributors. The flows will be first described with reference to the diagrammed embodiment in FIGURE 1; alternative operations will thereafter be discussed. The diagram illustrates at 4 and 6 respectively the cation and anion exchange resins as they would be separated during regeneration, these resins being actually mixed during on-stream flow when mixed bed operation is involved. In the present case, as will appear more fully hereafter, the cation exchange resin is of the hydrogen type, but ammoniated, while the anion exchange resin is of the hydroxide type. Numerous resins of these types are known and need not be specifically described. The cation exchange resin is of higher density than the anion exchange resin so that layer separation may be produced.

A typical plant in which the invention is especially useful is diagrammed. In the on-stream operation, the demineralized water passes from the ion exchange unit through connection 8 to usual heat exchangers 10 and then to the boiler 12 producing the steam for driving the turbine 14 exhausting to the condenser 16 from which return to the ion exchanger takes place through connection 19, makeup water being supplied, for example as at 18. Conventional pumps and other associated apparatus are not indicated. The overall purpose of the installation is to provide deionization to remove solids with maintenance of sufficient ammonia content in the system to minimize corrosion. Typical operation in a high pressure boiler installation may involve high flow rates through the demineralizer of the order of 50 gallons per minute per square foot of cross-sectional area.

Various inlet connections are provided (actually through valved piping): into the bottom of the demineralizer air may be introduced at 20, water at 22, ammonia (aqueous solution) at 24 and acid regenerant (sulfuric acid) at 26. Into the top of the demineralizer water may be introduced at 30 and caustic regenerant (caustic soda) at 32. A vent for bottom drainage and escape of air is provided at 28. Top outflow and bottom drain connections are not indicated but are provided in conventional fashion.

In accordance with the present invention there is special location of an outflow receiver constituted as usual by perforated piping 34 and communicating at 36 with a drain. In the usual demineralizer of the mixed bed type in which the resin granules are separated by flotation for regeneration, the outflow drain 34 would be located below the interface between the anion exchange and cation exchange resins. In accordance with the present invention, the outflow piping 34 is located differently, well above the resin interface 38, the spacing above this interface, indicated at D, ranging from a minimum of about one inch to a maximum which from a practical standpoint need not be more than about three inches, though this dimension may be greater without detriment except waste of capacity of the anion exchange resin. The low value of D is suitable for demineralizers of small horizontal cross-sectional area, while the larger values should be used when the cross-sectional area is large to avoid undesirable migration of sodium ions. The considerations involved will appear later.

Description of the process may conveniently begin with the conditions involved in on-stream flow at the time when regeneration is required.

Assuming mixed bed operation, the resins will then be intermixed and the usual operation will be taking place with removal of anions by the granules of anion exchange resin with substitution of hydroxyl ions in the water, while metallic cations will be removed with substitution of ammonia in the water. Since the cation exchange resin will be saturated with ammonia, any ammonia flowing through the mixed bed will pass through without absorption. Silica removal takes place as usual.

In preparation for regeneration, the on-stream flow of water is interrupted and backwash connections are established with the backwash water entering at 22 and passing out of the upper end of the exchanger through a waste connection. In order to effect scrubbing, especially if no prefilter is used, backwash water introduction may be alternated with introduction of air at 20 (after draining) to secure effective removal of any accumulation of dirt including insoluble metallic oxide deposits. Following this backwash is continued and then the water flow may be reduced in usual fashion to produce the desired sedimentation of the resin granules, so that the denser cation exchange resin provides a bottom layer as indicated at 4 while the lighter anion exchange resin provides an upper layer as indicated at 6. Such sedimentation of the layers provides a fairly well defined interface 38 which results in an ultimate relative location of the interface 38 below the outflow connection 34 as described above so that the outflow connection is well within the lower portion of the anion exchange resin bed.

Regeneration is then effected. While the sequence of regeneration is not of too great significance, and the acid regeneration of the cation exchange bed may precede the caustic regeneration of the anion exchange bed, it is desirable, for the most effective removal of all possible sodium, to undertake caustic regeneration of the anion exchange resin first.

For this purpose, it is desirable to provide a slow upflow of water through connection 22 to provide a barrier while the caustic regenerant flows downwardly through connection 32. The outflow connection 36 is opened so that liquids flowing both downwardly and upwardly are discharged therethrough. Because of the fact that the outflow connection is above the interface, caustic is effectively precluded from entering the cation exchange resin bed. It is this which is to be avoided. The portion of the anion exchange resin below the outflow connection 34 is, of course, not fully regenerated, but this is acceptable in the achievement of the effective prevention of entrance of sodium into the cation exchange resin.

The regeneration of the anion exchange resin by the caustic regenerant may be carried out otherwise in accordance with good practice establishing desirable caustic concentration, flow rates, and time of regeneration. When, in accordance with these practices, regeneration of the anion exchange resin above the outlet 34 is complete, the flow of the regenerant is discontinued and rinsing is produced by flow of water through the connection 30, a slow flow of water through the bottom connection 22 being continued to block the possibility of flow into the cation exchange resin. The rinsing may desirably be continued longer than would ordinarily be the case in the interest of removing substantially all sodium.

Regeneration of the cation exchange resin may then be carried out in usual fashion by introduction of sulfuric acid at 26. To block the flow of the acid regenerant into the upper portion of the anion exchange resin bed a slow flow of water may be provided at 30. The acid regenerant will, of course, pass through the portion of the bed 6 below the outlet connection 34 with absorption of the sulphate anion, but this waste of the lower portion of the bed may be tolerated, particularly since the flow will serve further to remove from this portion of the bed 6 any residual sodium. Following the completion of the acid regeneration, rinsing with water entering at 22 is carried out. The result of the foregoing is, of course, the removal of ammonia from the bed 4 leaving the cation exchange resin in its hydrogen state. Following the rinsing for removal of residual acid, the ammonia in solution is introduced at 24 to saturate the bed 4 by replacement of the hydrogen by ammonia. The ammoniation of the cation exchange resin prevents absorption of ammonia when the apparatus is on-stream.

Assuming that the operation is in mixed bed form, the water will then be drained from the tank 2 and air will be introduced to produce a thorough mixing of the resins. Following such mixing, the on-stream operation may be resumed. If the pH is insufficiently high due to any loss of ammonia, further ammonia may be introduced at any suitable point in the system.

While the foregoing procedure has been described as involving a mixed bed of the resins during on-stream operations, it will be evident that the beds may remain separated at all times with the water first passing through the anion exchange resin and then through the cation exchange resin.

The most significant part of the foregoing is the prevention of migration of sodium into the cation exchange resin. When this resin is ammoniated with the objective of preventing removal of ammonia from the system during on-stream flow, sodium may leak if sodium cation resin is inadvertently introduced and sodium will get into the power plant system with the possibility of depositing in the turbine or boiler. What is to be guarded against, however, is the entrance into the cation exchange resin bed (ultimately into the mixed bed) of such quantities of sodium resin to cause sodium leakage. In other words, the capability of the cation exchange resin, while reduced by reason of the ammoniation, is ample to take care of normal inflows of sodium into the system, but is unable to prevent the displacement or leakage of sodium such as might result from improper regeneration.

The ammoniated cation exchange resin is capable of removing other metals such as those producing hardness of water and those present in solution as a result of corrosion, e.g., iron and copper. The metals present by reason of corrosion, however, are more likely to be in an insoluble state and removed by filtering action of the bed, to be ultimately removed therefrom by backwashing.

While a specific procedure has been described, various alternatives may be used.

For example, the acid regenerant, instead of being made to flow upwardly, may be introduced to the distributor 34 and made to flow downwardly through the cation exchange resin. The rinsing in such case may follow the acid injection through the same path.

The ammonia may be introduced in the top of the unit to flow through both beds or may be introduced into the distributor 34 to flow downwardly. There may also be a rather different type of operation involved in the ammoniating action. Following the regeneration by alkali and acid in either order, and rinsing, the beds may be mixed and then put into on-stream operation. The cation exchange resin will then be in its hydrogen state and demineralization will take place in usual fashion. The ammonia in the system will then gradually ammoniate the cation exchange resin until the cation exchange resin is ammoniated. The ammonia will not displace the cations which are removed by the resin in its hydrogen state, and the removal of these ions will continue even after the ammoniation is effectively complete. Some additional ammonia in the system will, of course, be necessary to take into account the ammoniation which occurs, though after this is complete no further ammonia will be absorbed.

The last operation may be looked upon as involving gradual ammoniation with the cation exchange resin operating to effect proper exchange but gradually changing from its hydrogen state to its ammoniated state.

One of the primary advantages of the invention is the possibility of securing long on-stream runs between regenerations. Savings in ammonia will also be considerable consistent with the maintenance of high ammonia concentrations to give pH values such as required for prevention of iron corrosion. Iron oxide is effectively removed and removal of copper is also satisfactory. Silica and sodium chloride are adequately removed under conditions of any ordinary condenser leakage as well as ordinary water makeup conditions.

Figure 2:
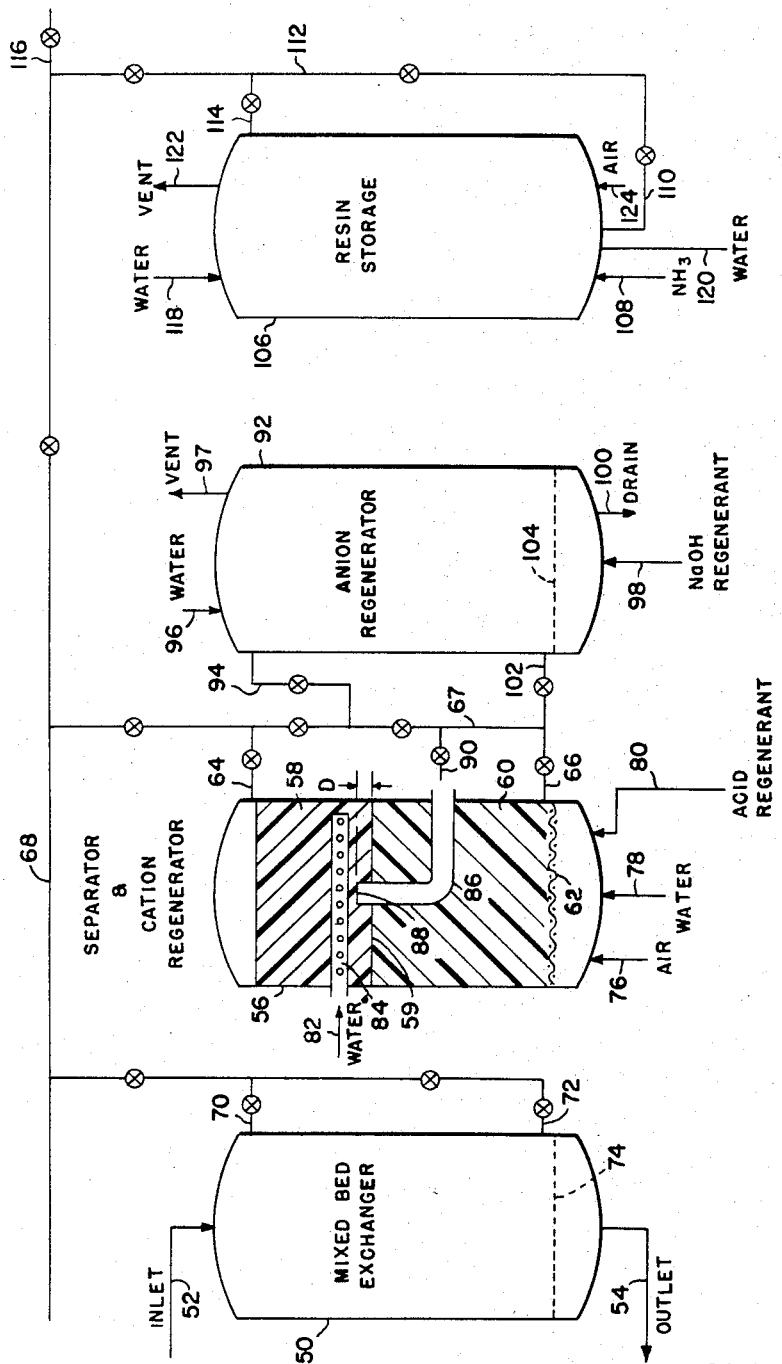
FIGURE 2 is a flow diagram illustrating another system provided in accordance with the invention.

FIGURE 2 relates to a second embodiment of the invention which is more practical when a plurality of mixed bed exchangers are used, the system involving regeneration in separate chambers so that an exchanger which must be regenerated is out of the on-stream operation for a minimum time. A single mixed bed exchanger is illustrated at 50, but it will be understood that usually this will be only one of a plurality of such exchangers ordinarily operating in parallel but in such fashion that when one is undergoing regeneration the others remain active. From the standpoint of the present invention, operations with respect to one exchanger only need be described it being understood that ordinarily regeneration of the several exchangers will take place sequentially. The on-stream inlet and outlet connections are indicated at 52 and 54. In general, in this figure, connections are primarily conventionalized, with some valves indicated, but with pumps and other auxiliary devices omitted. Actual connections may take many forms and it will be readily understood by those skilled in this art that proper connections are provided to produce the various flows which will be described.

In this modification the exchangers are not called upon to take part in the actual regeneration (and accordingly may be active for longer duty cycles), but regeneration uses auxiliary tanks, the principal one of which is the separator and cation regenerator 56. This is illustrated as in a condition containing both the anion exchange resin 58 and the cation exchange resin 60 in separated condition, the interface being indicated at 59. The respective resins may be as described previously, of different specific gravities so as to be readily separated by settling from suspension. The usual support, conventionalized as a screen 62, prevents outflow of the resins from the bottom of the tank. Pipe connections 64 and 66 are connected to a pipe 67 running to a line 68 through which, as will be indicated later, the resins are caused to flow in aqueous suspension.

Each of the exchangers is provided with upper and lower passages 70 and 72 for inflow and outflow of the resins, the resins being carried on the support 74 which may take any of the usual conventional forms to prevent outflow of the resins with the water being treated. The connections 70 and 72 run with suitable valving to the line 68. The separator 56 is provided with inlets 76, 78, and 80, respectively for air, water and acid regenerant. Drain and vent connections of conventional type are not illustrated.

A connection 82 for introduction of water communicates with a distributor 84 which may consist of an array of pipes containing perforations preventing outflow of resin. A sluice 86 is in the form of an elbow with the upper open end 88 located below the distributor 84 and at a level such as indicated spaced by a dimension D above the normal interface 59 between the anion and cation exchange resins when they are stratified. This dimension D may be as previously described in connection with FIGURE 1, for example it may be as little as one inch in smaller tanks but up to about three inches in larger ones. A greater value for D is generally unnecessary and merely represents some wastage of anion exchange resin 58. The dimension D is merely to insure a minimum percentage of cation exchange resin in the anion exchanger region of the separator.

The sluice 86 communicates at 90 through a valve with the upright pipe 67.

In the system illustrated in FIGURE 2, the anion exchange resin is regenerated separately from the cation exchange resin with advantages hereafter discussed, and for this purpose there is provided the separate regeneration vessel 92, the upper end of which is connected at 94 through a valve with the line 67. Water may enter the top of the vessel 92 at 96, and at the bottom of the vessel there is provided the line 98 for entry of caustic regenerant. A drain 100 is indicated. At 102 there is a valved connection between the lower portion of the vessel 92 above the perforated support 104 with the pipe 67.

In this system there is also desirably provided a separate resin storage tank 106 for temporarily holding the mixed resins which have been regenerated. At the bottom of this tank there is provided an inlet 108 for ammonia (in aqueous solution) and at the bottom of the tank there is an outlet 110 connecting through pipe 112 to the line 68 previously mentioned. The top of the tank is connected at 114 to the same line. Suitable valving is provided. The line 68 has a valved drain connection 116. Additionally illustrated are water connections 118 and 120 respectively at the top and bottom of the tank, a vent connection 122, and a lower air inlet connection 124.

It will be understood that the on-stream connections of what is shown in FIGURE 2 correspond to those illustrated in FIGURE 1, the system being particularly adapted for use in connection with a steam turbine power plant with the purposes, so far as the plant is concerned, the same as previously described.

Operation is as follows:

When one of the battery of exchangers requires regeneration, it is taken off the line and the mixed resins therein are transferred through the outlet 72 and by way of the line 68 into the now empty separator 56 through the connection 64. When this transfer is completed, resin from the storage tank 106, in the regenerated state, may be immediately transferred by way of connection 110 and lines 112 and 68, and connection 70, into the exchanger and it may be put back immediately on active operation. By this arrangement the down-time of any exchanger is minimized, and it need not be out of operation during the regeneration of its resins.

The mixed resins in the separator are desirably first backwashed while in the mixed state, to remove the solids which were filtered out during on-stream operation. The backwashing may comprise upward flow of water at suitable velocity, alternating with drainage and air flow to produce scrubbing. After the solids, including metal oxides, are effectively removed, the rate of water flow may be reduced as usual to provide sedimentation of the resins and their stratification to the condition illustrated in FIGURE 2, in which the anion exchange resin 58 overlies the cation exchange resin 60 with the interface 59 located below the open end 88 of the sluice 86, the spacing involving the dimension D previously described.

The next step involves transfer of the anion exchange resin 58 to the anion regenerator 92. This is effected by opening the connections at 90, 67, and 94 to provide delivery of the resin, water being introduced at 82 to provide fluidizing of the resin 58 so that a fluent suspension will flow through the sluice 86. That portion of resin above the level 88 will thus be transferred, the small amount between the top of the sluice and the interface 59 remaining in the separator 56. What is desired here is a transfer of the anion exchange resin with a minimum content of the cation exchange resin.

Following this transfer of the resin 58, separate regenerations of the two resins are effected.

The cation exchange resin 60 is regenerated in the separator 56 by the upward flow of acid regenerant (usually sulfuric acid). Following this, the usual rinsing may be effected either by downflow of water from the connection 82 or upflow from the connection 78. The rinsing water is discharged in usual fashion. The cation exchange resin 60 is thus left in its hydrogen state.

The anion exchange resin is regenerated in the vessel 92 by treatment with caustic soda entering at 98. Following regeneration, rinsing is effected by water entering at 96 and drained at 100. The result is that the anion exchange resin is left in its hydroxyl state. What is particularly desired here is the complete removal of any free caustic soda so that a very minimum of this will later enter the mixed bed. If care is exercised in the separation of the resins only, small amounts of cation resin will be carried over into the anion regenerator. Minimizing this carry over is highly desirable because the cation exchange resin treated with sodium hydroxide will take up the sodium with contribution ultimately of sodium to the demineralized water. The separate regeneration of the anion exchange resin lessens the possibility that any sodium will enter the cation exchange resin in the separator, as might possibly occur in the case of the modification of FIGURE 1 despite the production of barriers to flow as previously described.

Following regeneration of both resins, both of them are caused to flow into the resin storage tank 106 by connections which will be obvious. As introduced into this tank, the two resins may be substantially separated; but by the introduction of water and air under conditions of reasonably violent flow, good mixture may be attained.

After admixture is achieved, it is desirable to effect ammoniation of the cation exchange resin, and for this purpose ammonium hydroxide may be introduced at 108. However, this ammoniation may be deferred, the mixed resins being delivered to an exchanger 50 with ammoniation either effected therein or, gradually, by adding ammonia to the system at any suitable point. Ultimately the cation exchange resin will be in its ammoniated state.

Through the use of the storage tank 106, there is provided a receptacle for the regenerated resins, despite the fact that the exchanger from which the resins were obtained is back in use. This leads to the more effective duty cycle of the exchangers.

It will be evident that various details of arrangement of apparatus and procedure may be changed without departing from the invention as defined in the following claims.

What is claimed is:

1. In a condensate purification process involving high rate of flow of condensate through a demineralizer containing anion exchange resin granules and at least ultimately ammoniated cation exchange resin granules of higher density than the anion exchange resin granules, the steps of separating the resins into static lower and upper beds with the cation exchange resin granules forming the lower bed and the anion exchange resin granules forming the upper bed, establishing upper and lower portions of said upper bed of which the lower portion is of minor volume and lies stationary above the lower bed of cation exchange resin granules and of which the upper portion lies above said lower portion and is isolated thereby from the lower bed of cation exchange resin granules, regenerating with alkali only the anion exchange resin granules of the upper portion of said upper bed without regeneration of the anion exchange resin granules of the lower portion of said upper bed, removing excess of alkali regenerant from said upper portion, regenerating with acid the cation exchange resin granules of said lower bed, removing excess of acid regenerant from said lower bed, and ammoniating said cation exchange resin granules.

2. The process of claim 1 in which the alkali regeneration of the anion exchange resin granules of the upper portion of the upper bed is effected while the granules of that portion are removed from the lower portion of the upper bed.

3. The process of claim 2 in which said regenerations of both resins are followed by their admixture for condensate demineralization.

4. The process of claim 1 in which said regenerations of both resins are followed by their admixture for condensate demineralization.

5. In a condensate purification process involving high rate of flow of condensate through a demineralizer containing anion exchange resin granules and at least ultimately ammoniated cation exchange resin granules of higher density than the anion exchange resin granules, the steps of separating the resins into lower and upper beds with the cation exchange resin granules forming the lower bed and the anion exchange resin granules forming the upper bed, establishing upper and lower portions of said upper bed of which the lower portion is of minor volume and lies above the lower bed of cation exchange resin granules and of which the upper portion lies above said lower portion and is isolated thereby from the lower bed of cation exchange resin granules regenerating with alkali only the anion exchange resin granules of the upper portion of said upper bed without regeneration of the anion exchange resin granules of the lower portion of said upper bed, removing excess of alkali regenerant from said upper portion, regenerating with acid the cation exchange resin granules of said lower bed, removing excess of acid regenerant from said lower bed, and ammoniating said cation exchange resin granules, the alkali regeneration of the anion exchange resin granules of the upper portion of the upper bed being effected while the granules of that portion rest on the lower portion of that bed.

6. The process of claim 5 in which said regenerations of both resins are followed by their admixture for condensate demineralization.

References Cited

UNITED STATES PATENTS

| | | | |
|---|---|---|---|
| 2,666,741 | 1/1954 | McMullen | 210—30 |
| 2,736,698 | 2/1956 | Klumb et al. | 210—33 |
| 2,767,140 | 10/1956 | Fitch | 210—189 X |
| 2,803,347 | 8/1957 | Whitlock | 210—32 X |
| 3,062,739 | 11/1962 | Crits | 210—24 |
| 3,250,705 | 5/1966 | Levendusky | 210—32 X |

FOREIGN PATENTS 778,859  7/1957  Great Britain.

REUBEN FRIEDMAN, *Primary Examiner.*

C. DITLOW, *Assistant Examiner.*